(12) United States Patent
Perez-Sanchez

(10) Patent No.: US 7,600,718 B2
(45) Date of Patent: Oct. 13, 2009

(54) PIVOTED FLAP MECHANISM FOR ADJUSTING AN AERODYNAMIC PIVOTED FLAP ASSOCIATED WITH A WING

(75) Inventor: Juan Perez-Sanchez, Feldkirchen-Westerham (DE)

(73) Assignee: Eads Deutschland GmbH, Ottobrunn (DE)

( * ) Notice: Subject to any disclaimer, the term of this patent is extended or adjusted under 35 U.S.C. 154(b) by 380 days.

(21) Appl. No.: 11/400,509

(22) Filed: Apr. 10, 2006

(65) Prior Publication Data

US 2006/0226296 A1    Oct. 12, 2006

(30) Foreign Application Priority Data

Apr. 11, 2005    (DE) .................. 10 2005 016 638

(51) Int. Cl.
*B64C 3/50*    (2006.01)
(52) U.S. Cl. .................................... 244/215
(58) Field of Classification Search ............. 244/198, 244/201, 213, 214, 215, 216, 217
See application file for complete search history.

(56) References Cited

U.S. PATENT DOCUMENTS 4,381,093 A * 4/1983 Rudolph ............ 244/216

2005/0040294 A1    2/2005    Perez-Sanchez et al.

FOREIGN PATENT DOCUMENTS

| DE | 101 33920 A1 | 1/2003 |
|----|--------------|--------|
| DE | 101 33920 B4 | 5/2004 |

* cited by examiner

*Primary Examiner*—Michael R Mansen
*Assistant Examiner*—Michael Kreiner
(74) *Attorney, Agent, or Firm*—Greenblum & Bernstein, P.L.C.

(57) ABSTRACT

A pivoted flap mechanism for adjusting an aerodynamic pivotable flap associated with a wing, including: an actuating device including a gear device; a drive device including a drive arm that rotates about an axis, and which is structured and arranged to load the actuating device; and a flap support composed of a leading flap support portion and a trailing flap support portion. The aerodynamic pivotable flap is arranged on the flap support, and a steering arm of the gear device is swivellably coupled by a link to a part of the trailing flap support portion adjacent the leading flap support portion. The instant abstract is neither intended to define the invention disclosed in this specification nor intended to limit the scope of the invention in any way.

18 Claims, 3 Drawing Sheets

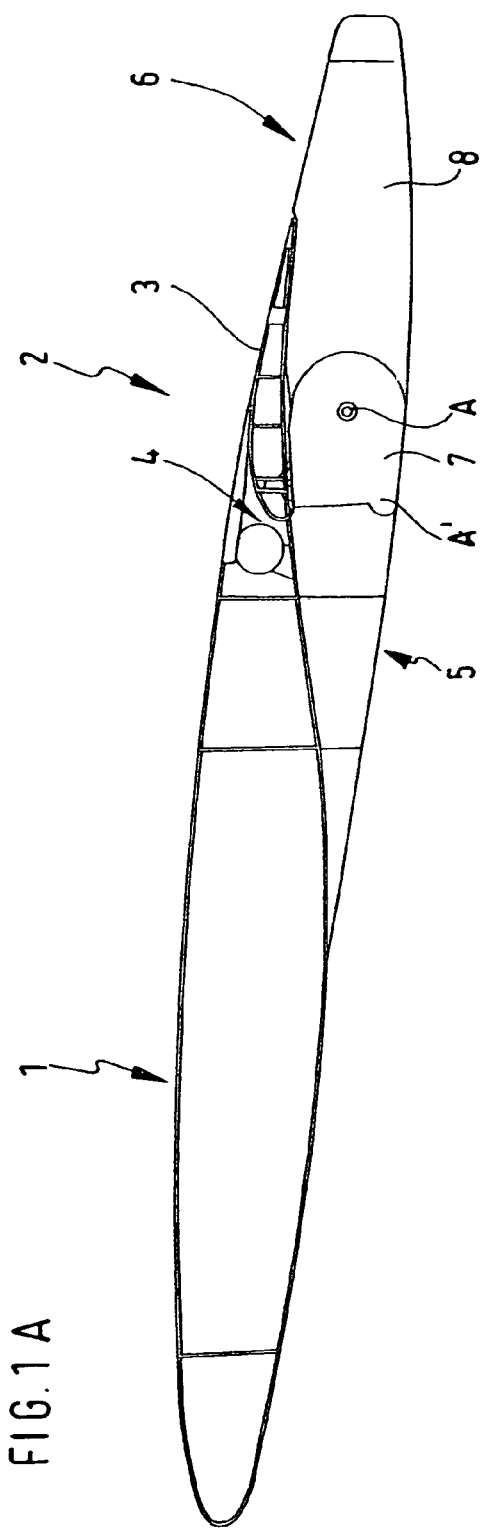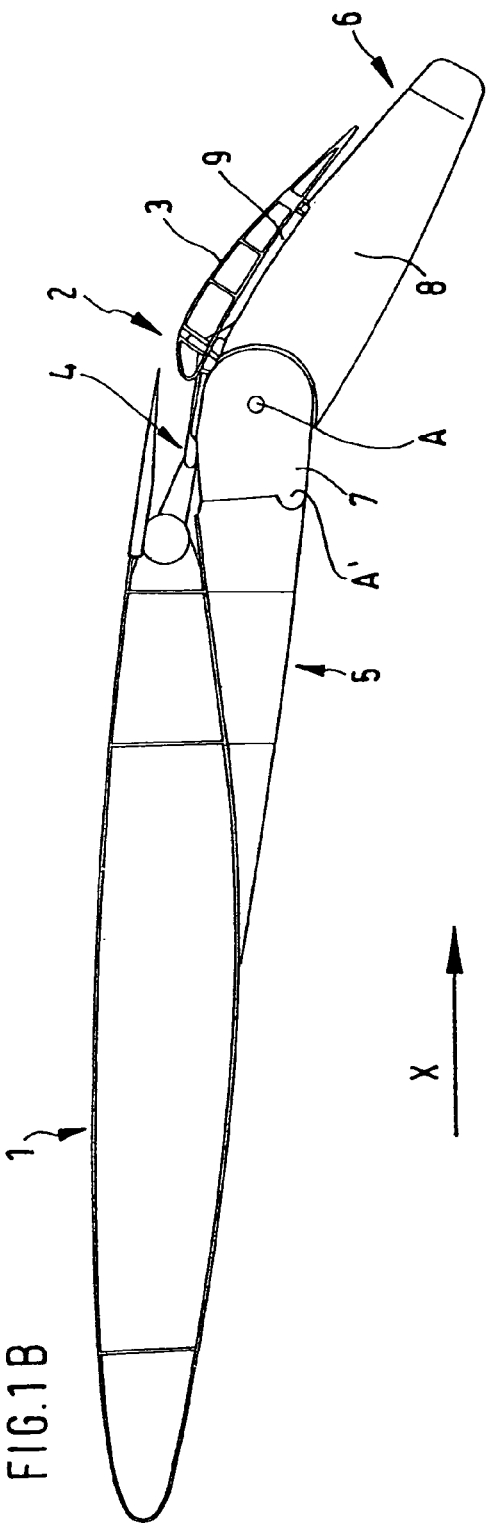

PIVOTED FLAP MECHANISM FOR ADJUSTING AN AERODYNAMIC PIVOTED FLAP ASSOCIATED WITH A WING

CROSS-REFERENCE TO RELATED APPLICATIONS

The present application claims priority under 35 U.S.C. §119 of German Patent Application No. 10 2005 016 638.5 filed Apr. 11, 2005, the disclosure of which is expressly incorporated by reference herein in its entirety.

BACKGROUND OF THE INVENTION

1. Field of the Invention

The present invention relates to a pivoted flap mechanism for adjusting an aerodynamic pivoted flap associated with a wing, in particular a lift flap, by way of a drive device.

2. Discussion of Background Information

In previous known wings, the lift flaps comprise at least one roller carriage, which is provided with rollers guided by a connecting link in a C-shaped rail provided on the structure of the wing. This connecting link guide predetermines the movement path of the lift flaps. Since all of the aerodynamic forces acting on a lift flap have to be supported on the rail via the rollers, it is necessary to configure the rail so that it is extremely stable, resulting in a high weight. The reason for this lies in the fact that very high loads concentrated across the rollers cause bending stress in a rail flange, so that the rail flange must have a high material thickness to withstand the loads.

A conventional wing is disclosed in German Patent Application No. DE 101 33 920 A1. In this wing, the lift flaps are actuated by a lever mechanism. A leading region of the pivoted flap, connected to the lever mechanism, is guided on a rail by a roller carriage. A connecting link guide is provided as an alternative to the roller carriage guide. In this wing, a portion of the aerodynamic loads acting on the pivoted flap is conducted via the lever mechanism into the supporting surface structure. The pivoted flap is coupled at its leading region to the drive device and to the gear device. A guide lever, with which the pivoted flap is supported on a trailing projection of the flap mount, is provided at the trailing region of the pivoted flap. This results in the flap mount extending a long way backwards.

SUMMARY OF THE INVENTION

The present invention relates to a system and method for configuring a pivoted flap mechanism in such a way that a clear reduction in weight is achieved.

The present invention is directed to a pivoted flap mechanism that is mounted on at least one of a plurality of flap mounts fastened to the wing and includes a drive device and an actuating device for bearing weight and for kinematic guidance of the pivoted flap. The actuating device comprises a gear device constructed as a crank mechanism. The gear device is supported on the flap mount by two adjacent links and is preferably constructed as a four-bar linkage. The drive device loads the actuating device and is provided with a drive arm that rotates about a drive axis. The pivoted flap is provided on a flap support. The flap support comprises a leading flap support portion pointing toward the wing and articulated to the drive arm. The flap support further comprises a trailing flap support portion pointing backwards and away from the wing, on which, adjacent the leading flap support portion, a link is provided by which a steering arm of the gear device is swivellably coupled.

In a first aspect of the invention, there is a pivoted flap mechanism for adjusting an aerodynamic pivotable flap associated with a wing. The mechanism comprises: an actuating device including a gear device; a drive device including a drive arm that rotates about an axis, and which is structured and arranged to load the actuating device; and a flap support composed of a leading flap support portion and a trailing flap support portion. The aerodynamic pivotable flap is arranged on the flap support. A steering arm of the gear device is swivellably coupled by a link to a part of the trailing flap support portion adjacent the leading flap support portion.

The aerodynamic pivotable flap may comprise a lift flap. The pivoted flap mechanism may be structured and arranged to be mountable on at least one of a plurality of flap mounts fastened to the wing. The actuating device is arranged for bearing weight and for kinematic guidance of the aerodynamic pivotable flap. The gear device is structured and arranged as a crank mechanism. The gear device is supported on a flap mount by two adjacent links. The gear device comprises a four-bar linkage. The leading flap support portion is arranged to point toward the wing, and the trailing flap support portion is arranged to point backwards and away from the wing. The leading flap support portion is articulated to the drive arm. The leading flap support portion and the trailing flap support portion are oriented to form an obtuse angle. The flap support is arranged as a one-part carrier. The flap support further comprises a carrying portion disposed where the leading flap support portion and the trailing flap support portion meet. The carrying portion is connected to a leading portion of the aerodynamic pivotable flap. The leading portion of the aerodynamic pivotable flap faces the wing. A trailing portion of the aerodynamic pivotable flap is supported on a trailing region of the trailing flap support portion.

In a second aspect of the invention, there is a pivoted flap mechanism for adjusting a flap associated with a wing, comprising: an actuating device including a gear device composed of a four-bar linkage; a drive device, including a drive arm that rotates about an axis, structured and arranged to load the actuating device; a flap support including a leading flap support portion and a trailing flap support portion arranged to form an obtuse angle, and a carrying portion disposed where the leading flap support portion and the trailing flap support portion meet; and a steering arm of the gear device being swivellably coupled by a link to a portion of the trailing flap support portion adjacent the leading flap support portion. The leading flap support portion is articulated to the drive arm. The carrying portion is connected to a leading portion of the flap. A trailing portion of the flap is supported on a trailing region of the trailing flap support portion.

In a third aspect of the invention, there is a method of moving a flap coupled to a flap support composed of a leading flap support portion and a trailing flap support portion, the flap being associated with a wing. The method comprises driving the leading flap support portion and steering the flap support with a steering arm connected to an end of the trailing flap support portion adjacent the leading flap support portion, wherein the driving and steering cause rotational and translational movement of the flap.

A rear end of the trailing flap support portion, which is remote from the leading flap support portion, is coupled to the flap. A carrying portion of the flap support, located where the leading flap support portion and the trailing flap support portion meet, is coupled to a front end of the flap.

Embodiments of the invention include a rigid flap support on which the pivoted flap is provided and to the leading end of which the drive arm of the drive device is articulated. This allows the omission of a guide lever at the trailing region of the pivoted flap. In this way, the pivoted flap is supported in its trailing region solely on the flap support, and this support is supported on the wing solely via the drive arm of the drive device and the steering arm of the gear device. As a result, the flap mount can be constructed so as to be much shorter, so that a considerable reduction in weight is achieved.

Implementations of the invention eliminate the need to provide a heavy roller carriage, or heavy rails, or a connecting link guide in the wing. The aerodynamic loads that occur at the pivoted flap are borne by the crank mechanism and supported on the wing via the pivots of the crank mechanism. This force distribution results in reduced weight and reduced wear when compared with roller carriages or connecting link guides. As a result, the crank mechanism may be constructed so as to be significantly narrower than conventional connecting link guides with a roller carriage and rail.

In a preferred embodiment, the flap support is formed by a one-part carrier bent at an obtuse angle. The carrier comprises a carrying portion connected to the leading portion of the pivoted flap that faces the wing at the point where the leading flap support portion and the trailing flap support portion meet at an obtuse angle.

In a further preferred embodiment the trailing portion of the pivoted flap is supported on the trailing region of the trailing flap support portion.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 1A-1B show a first embodiment of a wing according to the invention in two positions: in the retracted flap position (FIG. 1A) and in the extended flap position (FIG. 1B);

DETAILED DESCRIPTION OF EMBODIMENTS OF THE INVENTION

Figure 2A:
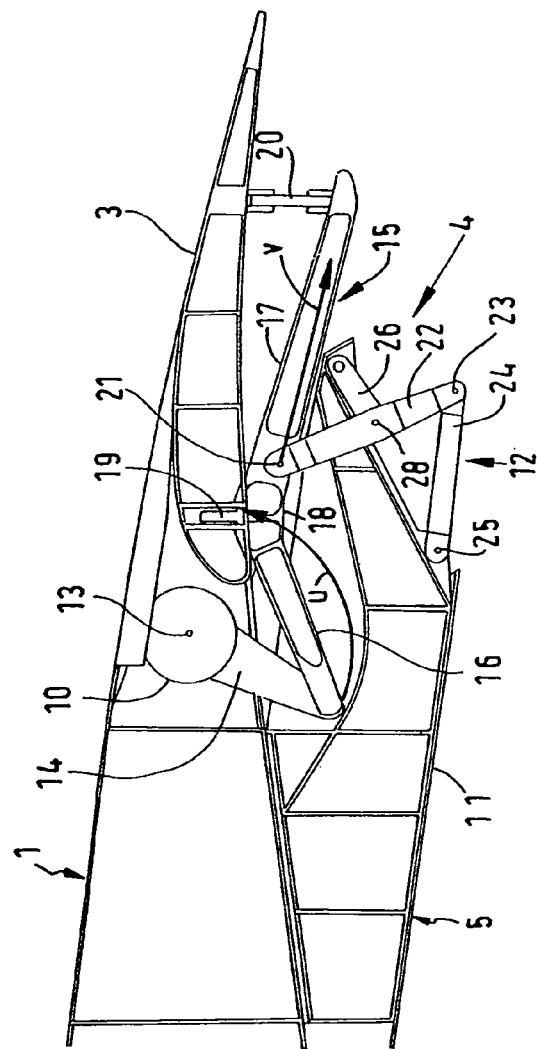
FIGS. 2A-2B show a sectional diagram of the actuating device, without the fairing housing, in two positions: in the retracted flap position (FIG. 2A) and in the extended flap position (FIG. 2B)

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1A shows in cross-section a pivoted flap mechanism on a wing 1 which, at its trailing edge in the direction of flow X (on the right in the figures), is provided with a lift flap arrangement 2. The lift flap arrangement 2 comprises at least one pivoted flap 3, for example a lift flap or landing flap. The flap 3 is mounted by at least one actuating device 4, described in more detail below, on a flap mount 5 (e.g., track) connected to the wing 1.

At least one fairing housing 6, within which the actuating device 4 is aerodynamically encased, is provided at the trailing edge of the wing 1 below the pivoted flap 3. In the illustrated example, the fairing housing 6 is divided into a first, leading fairing housing part 7 and a second, trailing fairing housing part 8. The two fairing housing parts 7, 8 are articulated to each other so as to be swivellable about an axis A. In embodiments, the axis A extends transversely to the direction of flow X.

FIG. 1B shows the wing of FIG. 1A with flap 3 extended backwards and swivelled downwards. The flap 3 and the trailing fairing housing part 8 connected to it are swivelled clockwise about the axis A. As depicted in FIG. 1B, the spacing between the trailing fairing housing part 8 and the flap 3 is slight and only a small gap 9 is formed. The two-part configuration of the fairing housing 6 allows the gap 9 to be very narrow so that little air can flow through the gap 9. This reduces both the build-up of noise and the aerodynamic resistances when compared with conventional flap arrangements.

Figure 2B:
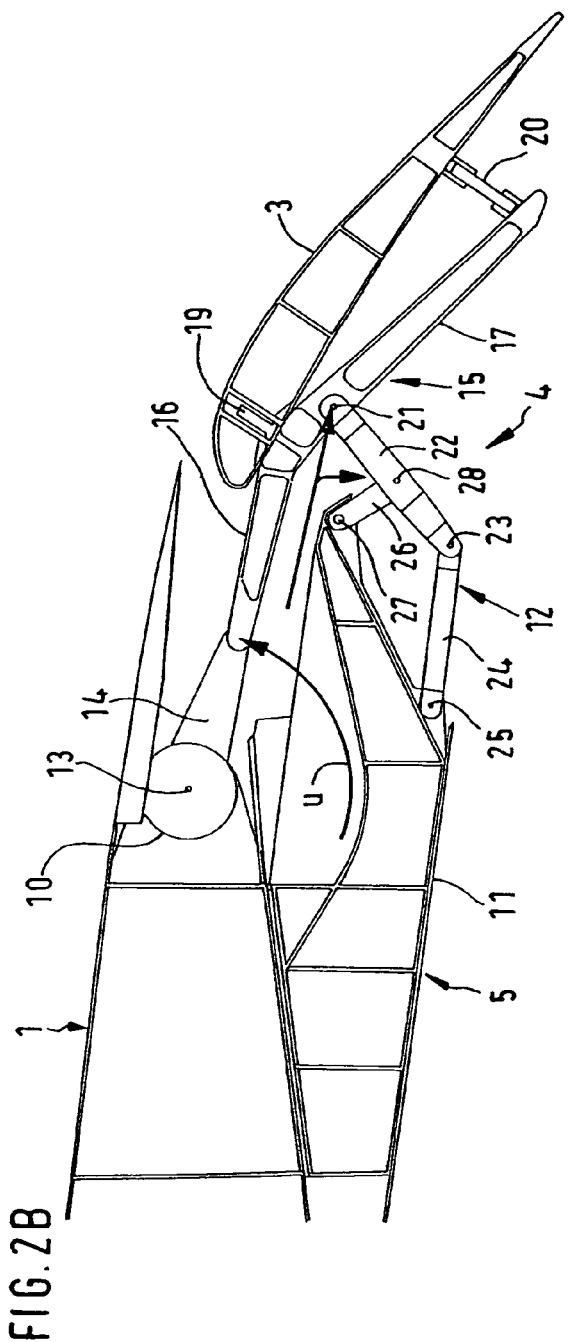

FIGS. 2A and 2B are enlarged views corresponding to FIG. 1A and FIG. 1B respectively, with the fairing housing 6 not being shown. The actuating device 4, encased by the fairing housing 6, and the entire pivoted flap mechanism are visible.

The actuating device 4 for the pivoted flap 3 comprises a drive device 10 provided at the trailing edge of the wing 1. The drive device 10 can, for example, include an electric or hydraulic motor. In embodiments, the drive device 10 comprises a shaft driven by an electric or hydraulic motor and corresponding, over at least a portion, to the trailing edge of the wing 1. A plurality of drive devices may also be provided for driving the flap 3. For example, two or more actuating devices 4, each encased by a fairing housing 6, are provided for driving the flap 3. However, the invention contemplates that a single actuating device 4 may be used.

The actuating device 4 comprises a gear device 12, constructed as a crank mechanism, in addition to the drive device 10. The gear device 12 comprises a plurality of levers and rods that are articulated to each other, are moveable relative to each other, and connect the drive device 10, the flap 3, the leading fairing housing part 7 and the trailing fairing housing part 8 to each other. A leading portion of the gear device 12 is mounted on a structural element 11 of the flap mount 5, which is provided in the trailing region of the wing 1 and rigidly connected to the wing 1.

In embodiments, the drive device 10 is constructed as a rotary actuator with a drive axis 13 and comprises a drive arm 14 that is movable about the drive axis 13. At its free end, the drive arm 14 is articulated to the leading end of a flap support 15. The flap support 15 is constructed as a one-part carrier bent at an obtuse angle and comprising a leading flap support portion 16 pointing toward the wing 1 and a trailing flap support portion 17 pointing away and downwards from the wing 1. A carrying portion 18 is constructed where the leading flap support portion 16 and the trailing flap support portion 17 meet at an obtuse angle. The carrying portion 18 is connected by a pin fastening 19 to the leading portion of the pivoted flap 3 facing the wing 1, and thus supports the pivoted flap 3 in its leading portion. A supporting strut 20 is provided at the trailing free end of the trailing flap support portion 17. The supporting strut 20 connects the trailing flap support portion 17 of the flap support 15 to the trailing region of the pivoted flap 3, and thus supports the trailing portion of the pivoted flap 3 on the flap support 15.

A steering arm 22 is mounted in articulated fashion on the trailing flap support portion 17 adjacent the carrying portion 18 by a first link 21. In embodiments, the steering arm 22 points away from the flap support 15 and downwards (i.e., facing away from the pivoted flap 3). A first end of a strut 24 is mounted in articulated fashion to the other end of the steering arm 22 by a second link 23. In this manner, the strut 24 acts as a supporting rod and the steering arm 22 acts as an oscillating rod. The other end of the strut 24 is swivellably mounted by a third link 25 on the lower trailing end portion of the structural element 11 of the flap mount 5.

A first end of a pendulum rod 26 is swivellably mounted on the structural element 11 of the flap mount 5 by a fourth link 27. The fourth link 27 is located above the third link 25 and further back with respect to the third link 25. The second end of the pendulum rod 26 is swivellably mounted on the steering arm 22, in a middle portion thereof, by a fifth link 28.

The pendulum rod 26, the portion of the steering arm 22 between the fifth link 28 and the second link 23, the strut 24 and the structural element 11 of the flap mount 5 between the third link 25 and the fourth link 27 form a four-bar linkage. The four-bar linkage has an asymmetric construction with respect to the length of the individual legs of the four-bar linkage between the respectively adjacent links. When the drive device 10 is rotated about the axis 13 in accordance with the arrow "u" (e.g., in the anticlockwise direction), the gear device 12 formed by the four-bar linkage, the flap support 15, and the length of the drive arm 14 are dimensioned in such a way that the first link 21, which swivellably connects the steering arm 22 to the trailing flap support portion 17, performs a substantially linear movement in the direction illustrated by the arrow "v". Thus, in embodiments, a straight-line motion gear is formed. The pivoted flap 3 is thus moved from the retracted state shown in FIG. 2A into the extended position shown in FIG. 2B. The same applies to the swivelling movement of the drive device 10 in the clockwise direction, wherein the first link 21 moves substantially linearly in the opposite direction of arrow "v". The pivoted flap 3 is thus moved from the extended position shown in FIG. 2B to retracted state shown in FIG. 2A.

In the extended state of the pivoted flap 3 (e.g., FIG. 2B), the aerodynamic loads acting on the pivoted flap 3 are conducted via the flap support 15, the steering arm 22, the strut 24, the pendulum rod 26, and the links connecting them into the flap mount 5. In the extended state, only a small portion of the aerodynamic loads acting on the pivoted flap 3 is supported on the wing 1 via the drive arm 14 and the drive device 10.

The aerodynamic loads introduced via the flap 3 are supported on the wing 1 via struts and link joints without the flow of force having to be guided over roller carriage joints or connecting link joints.

Figure 3A:
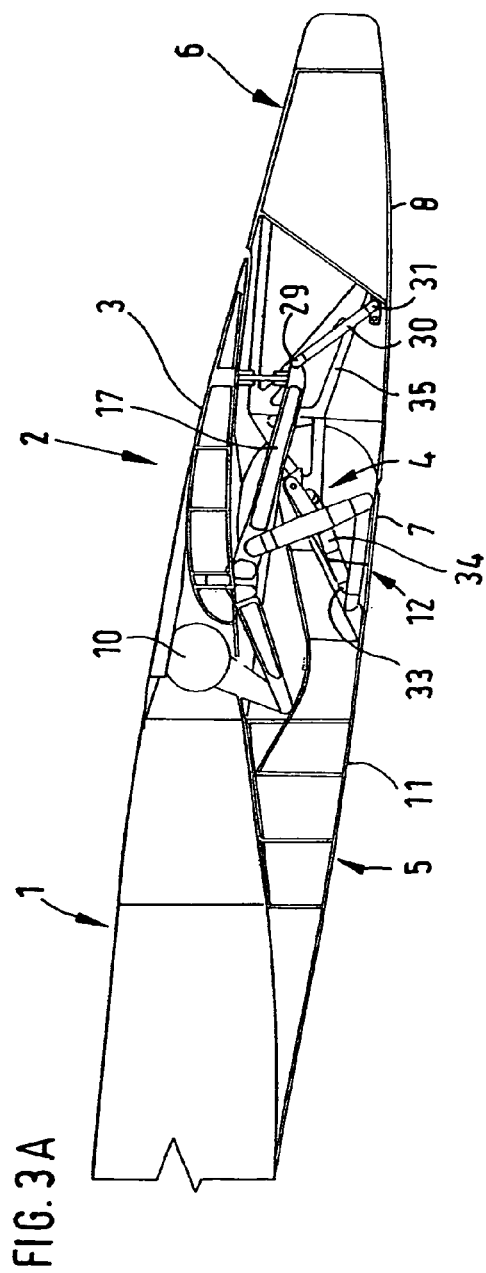
FIGS. 3A-3B show the embodiment of FIG. 1A in a longitudinal section with a view of the actuating device in two positions: in the retracted flap position (FIG. 3A) and in the extended flap position (FIG. 3B).
Figure 3B:
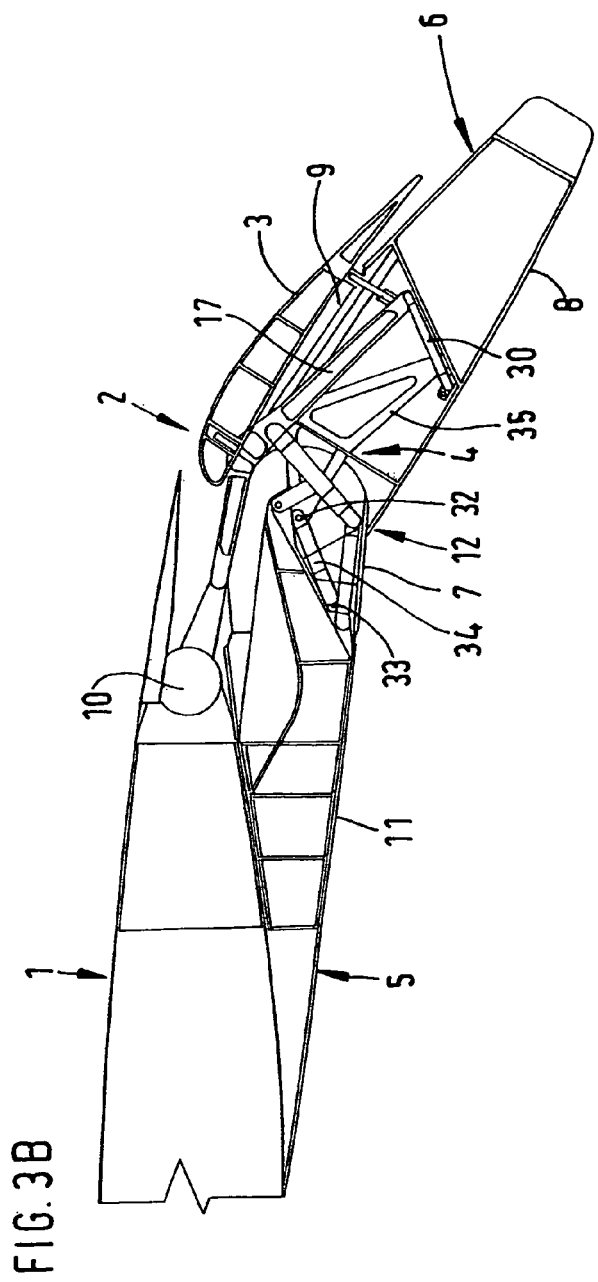

FIGS. 3A and 3B depict the actuating device 4 with the fairing housing parts 7 and 8 illustrated. The trailing fairing housing part 8 is coupled, via a trailing fairing guide rod 30, to the actuating device 4. A first end of the trailing fairing guide rod 30 is swivellably connected to the trailing flap support portion 17 by a link 29 at the trailing free end of the trailing flap support portion 17. An other end of the trailing fairing guide rod 30 is swivellably connected by a link 31 to the structure 35 of the trailing fairing housing part 8. A leading portion of the structure 35 of the trailing fairing housing part 8 engages the leading fairing housing part 7 and is connected thereto by a link 32, so as to be swivellable about the axis A. The leading fairing housing part 7 is mounted, so as to be swivellable about an axis A', by a link 33 at the trailing lower end of the structural element 11 of the flap mount 5. A leading fairing guide rod 34 is mounted by its ends in an articulated manner by the links 32 and 33. The leading fairing guide rod 34 supports the loads acting on the trailing fairing housing part 8 (in particular, the aerodynamic loads) directly on the flap mount 5. In embodiments, the axes A, A', and 13, and the swivelling axes of all the links extend parallel to each other.

FIG. 3B shows how the coupling of the trailing fairing housing part 8 via the gear device 12 to the flap 3 and to the drive device 10 causes the trailing fairing housing part 8 to swivel backwards and downwards when the flap 3 is extended. As a result, the gap 9 between the upper side of the trailing fairing housing part 8 and the lower side of the flap 3 is kept to a minimum.

Reference characters in the claims, the description and the drawings are merely used for the purpose of better understanding of the invention and are not intended to limit the scope.

The foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE NUMERALS 1 wing
2 lift flap arrangement
3 pivoted flap
4 actuating device
5 flap mount
6 fairing housing
7 first, leading fairing housing part
8 second, trailing fairing housing part
9 gap
10 drive device
11 structural element
12 gear device
13 drive axis
14 drive arm
15 flap support
16 leading flap support portion
17 trailing flap support portion
18 carrying portion
19 pin fastening
21 first link
22 steering arm
23 second link
24 strut
25 third link
26 oscillating rod
27 fourth link
28 fifth link
29 link 30 trailing fairing guide lever
31 link
32 link
33 link
34 leading fairing support strut
35 structure
A axis
A' axis
u arrow
v arrow
X direction of flow

What is claimed:

1. A pivoted flap mechanism for adjusting an aerodynamic pivotable flap associated with a wing, comprising:
   an actuating device including a gear device;
   a drive device including a drive arm that rotates about an axis, and which is structured and arranged to load the actuating device; and
   a flap support composed of a leading flap support portion and a trailing flap support portion,
   wherein the aerodynamic pivotable flap is arranged on the flap support, and
   wherein a steering arm of the gear device is swivellably coupled by a link to a part of the trailing flap support portion at a location adjacent the leading flap support portion and forward of a midpoint of a chord of the aerodynamic pivotable flap.

2. The pivoted flap mechanism of claim 1, wherein the aerodynamic pivotable flap comprises a lift flap.

3. The pivoted flap mechanism of claim 1 being structured and arranged to be mountable on at least one of a plurality of flap mounts fastened to the wing.

4. The pivoted flap mechanism of claim 1, wherein the actuating device is arranged for bearing weight and for kinematic guidance of the aerodynamic pivotable flap.

5. The pivoted flap mechanism of claim 1, wherein the gear device is structured and arranged as a crank mechanism.

6. The pivoted flap mechanism of claim 1, wherein the gear device is supported on a flap mount by two adjacent links.

7. The pivoted flap mechanism of claim 1, wherein the gear device comprises a four-bar linkage.

8. The pivoted flap mechanism of claim 7, wherein the four-bar linkage comprises:
   a structural element of a flap mount connected to the wing;
   a strut swivellably mounted to the structural element and swivellably mounted to the steering arm;
   a pendulum rod swivellably mounted to the structural element and swivellably mounted to the steering arm; and
   the steering arm.

9. The pivoted flap mechanism of claim 1, wherein:
   the leading flap support portion is arranged to point toward the wing, and
   the trailing flap support portion is arranged to point backwards and away from the wing.

10. The pivoted flap mechanism of claim 1, wherein the leading flap support portion is articulated to the drive arm.

11. The pivoted flap mechanism of claim 1, wherein the leading flap support portion and the trailing flap support portion are oriented to form an obtuse angle.

12. The pivoted flap mechanism of claim 11, wherein the flap support is arranged as a one-part carrier.

13. The pivoted flap mechanism of claim 11, wherein the flap support further comprises a carrying portion disposed where the leading flap support portion and the trailing flap support portion meet.

14. The pivoted flap mechanism of claim 13, wherein the carrying portion is connected to a leading portion of the aerodynamic pivotable flap.

15. The pivoted flap mechanism of claim 14, wherein the leading portion of the aerodynamic pivotable flap faces the wing.

16. The pivoted flap mechanism of claim 14, wherein a trailing portion of the aerodynamic pivotable flap is supported on a trailing region of the trailing flap support portion.

17. The pivoted flap mechanism of claim 1, further comprising:
   a pin connecting a leading portion of the flap to the flap support; and
   a strut connecting a trailing region of the flap to the flap support,
   wherein the steering arm is connected to the flap support at a location along the flap support between the pin and the strut.

18. A pivoted flap mechanism for adjusting a flap associated with a wing, comprising:
   an actuating device including a gear device composed of a four-bar linkage;
   a drive device, including a drive arm that rotates about an axis, structured and arranged to load the actuating device;
   a flap support including a leading flap support portion and a trailing flap support portion arranged to form an obtuse angle, and a carrying portion disposed where the leading flap support portion and the trailing flap support portion meet;
   a steering arm of the gear device being swivellably coupled by a link to a portion of the trailing flap support portion at a location adjacent the leading flap support portion and forward of a midpoint of a chord of the flap;
   the leading flap support portion being articulated to the drive arm;
   the carrying portion being connected to a leading portion of the flap; and
   a trailing portion of the flap being supported on a trailing region of the trailing flap support portion.

* * * * *